United States Patent Office 3,039,855
Patented June 19, 1962

3,039,855
OXIDATION OF SULFUR COMPOUNDS
Peter Urban, McHenry, Ill., assignor to Universal Oil Products Company, Des Plaines, Ill., a corporation of Delaware
No Drawing. Filed Mar. 6, 1961, Ser. No. 93,346
7 Claims. (Cl. 23—225)

This invention relates to the oxidation of sulfur compounds in a novel manner.

Sulfur compounds appear in many forms, including hydrogen sulfide, mercaptans, both aliphatic and cyclic, heterocyclic compounds, etc. In many cases it is desired to oxidize the sulfur compounds into compounds of different chemical composition. For example, hydrogen sulfide is recovered in many industrial operations and, in one embodiment, must be oxidized before it can be disposed of in neighboring streams. Sulfides in general have a high oxygen demand and accordingly will deprive marine life and other living organisms in neighboring streams of oxygen needed for survival. For this reason, many geographical territories prohibit the dumping of hydrogen sulfide into the neighboring streams.

As another example, it is desired to oxidize mercaptans to disulfides. Mercaptans are foul smelling compounds and are converted to disulfides to eliminate the bad odor.

In other cases, it is desired to produce elemental sulfur from the sulfur compounds and this is accomplished by oxidation in accordance with the present invention.

Regardless of the object and regardless of the particular sulfur compound, it now has been found that effective oxidation can be accomplished by conducting the oxidation in the presence of a phthalocyanine catalyst at a pH of not greater than 7. The phthalocyanine catalyst is an effective oxidation catalyst but heretofore the use of this catalyst has always been in a basic medium. While in many cases the use of a basic medium is desirable, in other cases advantages prevail for a process effected at neutral or acidic conditions and this is accomplished in accordance with the present invention.

In one embodiment the present invention relates to a process for oxidizing a sulfur compound with an oxidizing agent in the presence of a phthalocyanine catalyst at a pH of not greater than 7.

Any suitable phthalocyanine catalyst may be used in the present invention and preferably comprises a metal phthalocyanine. Particularly preferred metal phthalocyanines include cobalt phthalocyanine and vanadium phthalocyanine. Other metal phthalocyanines include iron phthalocyanine, copper phthalocyanine, nickel phthalocyanine, molybdenum phthalocyanine, chromium phthalocyanine, tungsten phthalocyanine, etc. In most cases a derivative of the phthalocyanine is preferred. A particularly preferred derivative is the sulfonate derivative. Thus, a particularly preferred phthalocyanine catalyst is cobalt phthalocyanine. For increased solubility in neutral and acidic solutions, the trisulfonate is preferred. It is understood that the disulfonate or mixtures of the di- and trisulfonates, as well as more highly sulfonated derivatives including, for example, cobalt phthalocyanine tetrasulfonate, may be used. Thus, preferred compounds for use in the present invention comprise cobalt phthalocyanine trisulfonate, vanadium phthalocyanine trisulfonate, etc., or mixtures of these with the corresponding disulfonates. These compounds may be obtained from any suitable source or may be prepared in any suitable manner as, for example, by reacting cobalt or vanadium phthalocyanine with 25–50% fuming sulfuric acid. While the sulfonic acid derivatives are preferred, it is understood that other suitable derivatives may be employed. Other derivatives include particularly the carboxylated derivative which may be prepared, for example, by the action of trichloroacetic acid on the metal phthalocyanine or by the action of phosgene and aluminum chloride. In the latter reaction the acid chloride is formed and may be converted to the desired carboxylated derivative by conventional hydrolysis.

In one embodiment of the invention, the phthalocyanine catalyst is employed as an aqueous or acidic solution. In another embodiment the phthalocyanine catalyst is disposed on a suitable solid carrier and utilized as a fixed bed. Any suitable carrier may be employed. Charcoal is particularly preferred and includes, for example, bone char, wood charcoal, charcoal made from coconut or other nut shells, fruit pits, etc. Other solid carriers include alumina, silica, magnesia, thoria, zinc oxide, etc., as well as naturally occurring ores such as bauxite, diaspore, diatomaceous earth, kaolin, kieselguhr, etc., preferably being treated by washing, acid and/or caustic, etc., to at least partially purify the same. The phthalocyanine catalyst may be disposed on the solid carrier in any suitable manner including soaking, suspending, dipping, immersing, etc. of particles of the solid carrier in a solution of the phthalocyanine catalyst or by spraying, pouring or otherwise contacting the solution of the catalyst with the solid particles.

Oxidation of the sulfur compound is effected in any suitable manner. When the sulfur compound is recovered as a gas, it may be passed, together with air, through a pool of a solution of the phthalocyanine catalyst at a pH of not greater than 7 or the gas may be passed upwardly through a descending solution of the phthalocyanine catalyst in a neutral or acidic medium. In another embodiment the gaseous sulfur compound may be passed into contact with a solid bed and the sulfur compound adsorbed on the solid bed. In one embodiment the solid bed may contain the catalyst as heretofore described and, in another embodiment, it may comprise a suitable adsorbent, preferably selected from those specifically set forth hereinabove but not containing the catalyst. When the adsorbent contains the catalyst, the adsorption of the sulfur compound may be effected first and then air or other oxygen-containing gas introduced to effect the desired oxidation or, in another embodiment, air may be introduced along with the sulfur-containing gas and oxidation effected in one step.

When the solid adsorbent does not contain the catalyst, the introduction of the sulfur-containing gas is discontinued after adsorption of the sulfur compound on the solid adsorbent and then air and a neutral or acidic solution of the catalyst are contacted with the solid adsorbent to effect oxidation of the sulfur compounds.

When the sulfur compound is collected as a solution in a liquid as, for example, mercaptans in a hydrocarbon distillate, the distillate may be vaporized and the vapors then treated in the manner described above. In another embodiment the liquid containing the sulfur compounds may be passed concurrently or countercurrently to a stream of an aqueous or acidic solution of the phthalocyanine catalyst and air, and oxidation of the sulfur compound is effected in this manner.

When the catalyst is used as a liquid solution, the solution is neutral or acidic and generally will have a pH of from about 2 to 7. Any suitable acidic material may be used to prepare the desired solution. Illustrative acids include acetic acid, propionic acid, butyric acid, citric acid, oxalic acid, malonic acid, succinic acid, maleic acid, etc., boric acid, phosphoric acid, etc., as well as monosodium borate, sodium acid phosphate, sodium citrate, etc. It is understood that a mixture of acids may be employed and that the concentration of acid will be sufficient to form a solution of a pH of below 7 and of the particular pH desired in the particular case.

Any suitable oxidizing agent may be used in the present invention. Air is preferred because of its cheapness and ready availability. However, it is understood that oxygen or other suitable oxygen-containing gas may be employed.

The oxidation is effected at any suitable temperature which generally will range from ambient to 200° F. Although higher temperatures may be employed, in general the higher temperatures are not necessary and usually will not be used. However, depending upon the particular method of treatment, the pressure may range from atmospheric to superatmospheric which usually will not exceed about 100 pounds per square inch, although pressures up to 2000 pounds or more may be employed if desired. At the higher pressures, higher temperatures which usually will not be above about 400° F. may be used.

As hereinbefore set forth, the oxidation of sulfur compounds may range from mild oxidation as, for example, the oxidation of a mercaptan to a disulfide, to a more severe oxidation as, for example, the oxidation of hydrogen sulfide or other sulfur compounds to free sulfur. When free sulfur is formed as product, it may be recovered from liquid effluent products by filtration, centrifugal separation or in any other suitable manner. In any event, it is understood that the solution of catalyst may be separated from the oxidation products and reused for the further oxidation of sulfur compounds.

The following examples are introduced to illustrate further the novelty and utility of the present invention but not with the intention of unduly limiting the same.

*Example I*

A series of runs were made to demonstrate that effective oxidation is accomplished at a pH of not greater than 7. In this series of runs, several 100 ml. solutions were prepared to contain 0.00675 mol of hydrogen sulfide, 0.123 mol of $NH_3$ and 200 parts per million of cobalt phthalocyanine disulfonate. The pH of these solutions was varied by adding varying amounts of acetic acid.

Each solution then was treated by being supplied to a stirred reactor and oxygen from a calibrated oxygen reservoir was introduced into the reactor. The oxidation was effected at room temperature. In one run, the pH of the solution was 6.2. When treating in this manner, 154 ml. of oxygen was absorbed. The rate of oxygen absorption was 62 ml. of oxygen per minute.

*Example II*

In another run in the same manner as described in Example I except that the pH of the solution was 5.3, 176 ml. of oxygen was absorbed. The rate of oxygen absorption was 44 ml. of oxygen per minute.

*Example III*

For comparative purposes the results of a run similar to that described in Examples I and II is reported. In this run the pH of the solution was 8.3. 110 ml. of oxygen was absorbed and the rate was 27 ml. of oxygen per minute. It will be seen from a comparison of Examples I and II with Example III that the amount of oxygen absorbed and the rate thereof was considerably greater in the solutions having a pH of below 7.

*Example IV*

A reaction zone is partly filled with an aqueous solution of cobalt phthalocyanine trisulfonate. Hydrogen sulfide gas and air are bubbled through the aqueous solution at atmospheric temperature. The air is used in a slight excess of that stoichiometrically required to effect oxidation of the hydrogen sulfide to free sulfur. After completion of the oxidation, the supply of hydrogen sulfide and air is discontinued, and the products are then treated to recover the free sulfur. After removal of the free sulfur, the aqueous solution is reused for the oxidation of additional quantities of hydrogen sulfide.

*Example V*

A naphtha fraction containing mercaptans is passed along with air upwardly through a solid bed of charcoal containing 1% by weight of vanadium phthalocyanine disulfonate disposed as a fixed bed in a reaction zone. Mercaptans are oxidized to disulfides which remain dissolved in the naphtha fraction and withdrawn from the upper portion of the reaction zone. The overhead effluent products then are passed into a separating zone, where excess air is vented to the atmosphere and separated from naphtha which now is doctor sweet. It will be noted that the oxidation is effected in the absence of alkaline solution and therefore is at a pH of not greater than 7.

I claim as my invention:

1. A process for oxidizing a sulfur compound selected from the group consisting of hydrogen sulfide and mercaptans to an oxidation product selected from the group consisting of elemental sulfur and disulfides, which comprises reacting said sulfur compound with an oxidizing agent in the presence of a phthalocyanine catalyst at a pH of not greater than 7.

2. A process for oxidizing a sulfur compound selected from the group consisting of hydrogen sulfide and mercaptans to an oxidation product selected from the group consisting of elemental sulfur and disulfides, which comprises reacting said sulfur compound with air in the presence of cobalt phthalocyanine trisulfonate catalyst at a pH of not greater than 7.

3. A process for oxidizing a sulfur compound selected from the group consisting of hydrogen sulfide and mercaptans to an oxidation product selected from the group consisting of elemental sulfur and disulfides, which comprises reacting said sulfur compound with air in the presence of vanadium phthalocyanine trisulfonate catalyst at a pH of not greater than 7.

4. A process for oxidizing hydrogen sulfide to elemental sulfur which comprises reacting said hydrogen sulfide with air in the presence of a phthalocyanine catalyst at a pH of from about 2 to 7.

5. A process for oxidizing a mercaptan to a disulfide which comprises reacting said mercaptan with air in the presence of a phthalocyanine catalyst at a pH of from about 2 to 7.

6. A process for oxidizing hydrogen sulfide to elemental sulfur which comprises reacting hydrogen sulfide with an oxidizing agent in the presence of a phthalocyanine catalyst at a pH of not greater than 7.

7. A process for oxidizing a mercaptan to a disulfide which comprises reacting the mercaptan with an oxidizing agent in the presence of a phthalocyanine catalyst at a pH of not greater than 7.

References Cited in the file of this patent

UNITED STATES PATENTS 2,853,432     Gleim et al. _____ Sept. 23, 1958